United States Patent [19]
Pearson

[11] 3,771,489
[45] Nov. 13, 1973

[54] MOVING METER ELEMENT AND POINTER

[75] Inventor: David B. Pearson, Raritan, N.J.

[73] Assignee: Weston Instruments, Inc., Newark, N.J.

[22] Filed: Aug. 20, 1971

[21] Appl. No.: 173,527

[52] U.S. Cl. .......................... 116/136.5, 324/154 PS
[51] Int. Cl. ............................................ G01d 13/22
[58] Field of Search ................... 116/136.5, DIG. 6, 116/129, 133; 324/154 R, 154 PS; 73/388, 432

[56] References Cited
UNITED STATES PATENTS

| | | | |
|---|---|---|---|
| 1,070,310 | 8/1913 | Weston | 116/136.5 |
| 1,221,548 | 4/1917 | Kraft et al. | 116/136.5 |
| 1,449,705 | 3/1923 | St. Clair | 116/136.5 |
| 1,913,201 | 6/1933 | Haven | 116/136.5 |
| 2,264,726 | 12/1941 | Stickney | 116/129 |

Primary Examiner—Louis J. Capozi
Attorney—William R. Sherman et al.

[57] ABSTRACT

A moving coil assembly of a meter has an integral pointer mounting staff. The pointer takes the form of a thin wall tubular body formed from a dimensionally stable plastic material with memory characteristics such as polysulfone. A second embodiment of the pointer has its end flattened to present a thin knife blade profile. Either pointer is readily mounted on the staff of the moving assembly merely by pushing the pointer over the staff to a seated position as determined by stop edges adjacent the base of the staff. Because of its memory characteristics the pointer will straighten itself even though it is impacted against a stop with sufficient force to initially bend the pointer.

11 Claims, 6 Drawing Figures

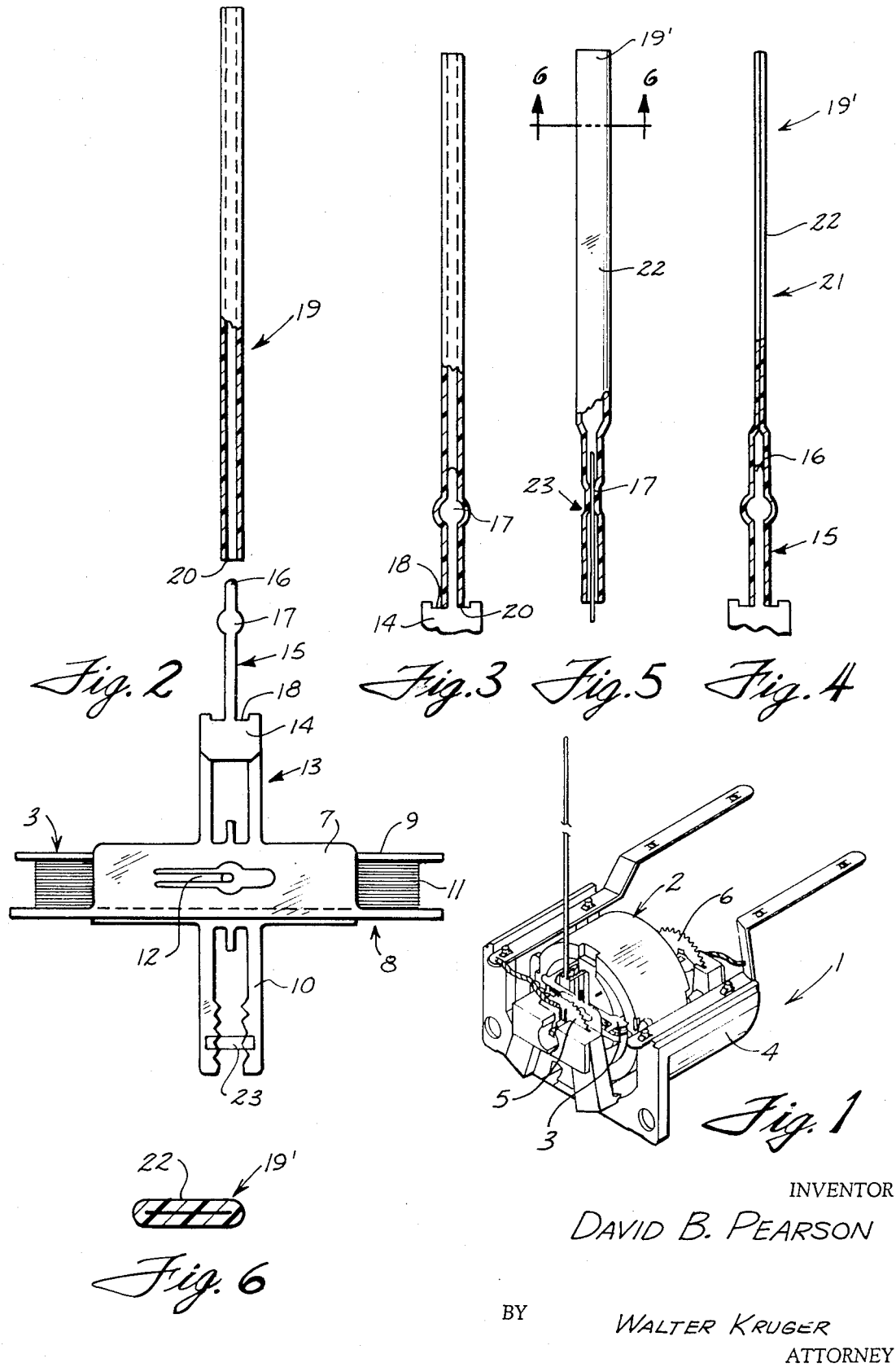

MOVING METER ELEMENT AND POINTER

This invention relates to an improved pointer for sensitive instruments. More specifically, the invention relates to a low cost pointer for electrical instruments having a moving assembly, for example, a D'Arsonval type meter.

In the past, pointers for meters and other measuring instruments of various types have been relatively expensive because of the difficulty of forming the pointer and mounting same on a moving element of the instrument. The prior art pointers have been predominantly of non-magnetic metal such as copper or aluminum which exhibit non-corrosive characteristics in the environments where the meters or instruments are usually used. In some instances, the pointers are tubular to facilitate connection to the moving element of the meter. In other constructions the pointers are provided with some means to clamp the pointer to the moving element. In both these prior art constructions, however, it has been necessary to either crimp the pointer to the moving element or to secure the pointer with a solder or cement.

It has been found that solders and cements are unsatisfactory because their characteristics change with the age of the meter with the result that the static balance of the meter is not maintained. As a result, the instrument retains its accuracy for only a relatively short period of time, for perhaps a year or so, and it then becomes necessary to recalibrate the instrument.

A disadvantage of a metal pointer is that the pointer frequently bends when current substantially in excess of the full scale deflection current for the meter is applied to the meter. Application of such high current to the meter causes the moving element to deflect quite rapidly with the result that the pointer can be permanently bent when it engages a stop provided to prevent substantial over travel of the pointer.

In accordance with this invention there is provided a pointer for sensitive instruments which avoids the problems and inaccuracies presented by the prior art pointers. The pointer is formed from a plastic material with non-moisture absorbing characteristics and is frictionally held in position on the moving portion of the instrument by virtue of the elasticity of the material of the pointer. The plastic material of the pointer has memory return characteristics which allow the pointer to be impacted against a stop with the result that the pointer may bend slightly but will soon return to its initial straight condition. 'n addition, by virtue of the elasticity of the pointer, the pointer can be simply mounted on the moving portion of the instrument by pushing same over a staff having an enlarged or bulbous portion whereupon the pointer is frictionally retained on the moving element without the need for cements, crimping, or assembly other than merely pushing the pointer onto the staff.

It has been found that a polysulfone pointer of a diameter on the order of 0.020 – 0.030 inches with a wall thickness of 3 mils or less can be used to extreme advantage with D'Arsonval type meters with scale sizes of 2 inches to 7 inches.

Advantageously, the moving element of the meter movement to which the pointer is assembled is provided with a stop shoulder so successively assembled meters will each have the center of gravity of the pointer at essentially the same location relative to the moving element. By virtue of this feature, balancing of successively assembled meters having the same length pointer is simplified since the extent of unbalance created by the pointer is essentially the same for each meter.

While the tubular polysulfone plastic material of the pointer has memory characteristics which cause the pointer to straighten, should it be bent slightly, the polysulfone tube can be permanently flattened along a desired portion of its length to form a knife edge indicator. Such flattening to form the knife edge is accomplished by tightly squeezing the wall of the tube between flat elements of a suitable press.

Correspondingly, an object of this invention is a light weight plastic pointer formed from a material with memory characteristics and having substantially non-moisture absorbing characteristics whereby the pointer is durable, straightens itself if bent, and is readily connected to the moving portion of a sensitive instrument.

Another object is a light weight pointer formed from a durable non-moisture absorbing plastic material having a thin wall on the order of 3 mils or less.

Another object is a pointer having a tubular body formed from a polysulfone plastic material.

An additional object is a pointer formed from a durable dimensionally stable plastic material with non-moisture absorbing characteristics which has a flattened knife edge indicating portion to permit accurately reading the instrument with which the pointer is used.

Another object is a unique pointer and moving coil assembly for a D'Arsonval type meter movement, the coil assembly including a staff with a stop shoulder to assure accurately positioning the pointer thereon, and a weight to balance the coil assembly and pointer; the pointer having non-moisture absorbing characteristics whereby the coil assembly remains balanced and requires no recalibration.

Numerous other objects, features, and advantages will become apparent with reference to the drawings which form a part of the specification and in which:

FIG. 1 is a pictorial view of a D'Arsonval type meter equipped with the pointer and moving assembly of this invention;

FIG. 2 is an enlarged front elevational view of the coil assembly with the pointer in position to be pushed over the pointer mounting staff;

FIG. 3 is a partial view corresponding to FIG. 2 and showing the pointer in position on the staff;

FIG. 4 is a view corresponding to FIG. 3 and showing a second embodiment of the pointer of this invention;

FIG. 5 is a side view of the pointer and staff of FIG. 4 with portions thereof cut-away; and FIG. 6 is a view in section taken along line 6—6 of FIG. 5.

Referring now to the drawings in detail and particularly to FIGS. 1 and 2 there is shown a meter movement 1 comprised of a magnetic circuit 2, a moving coil assembly 3, and a base 4. Coil assembly 3 is suspended for pivotal movement about an axis by taut bands which extend respectively between a front support element 5 and the front of coil assembly 3, and a rear support element 6 and the rear of coil assembly 3.

At the front of the moving coil assembly 3 is a support plate 7 integral with and which projects upwardly from a lower coil form part 8. There is also an upper coil form part 9 which has a downwardly projecting integral tail 10 at the rear of the assembly. A coil 11 is mounted on the coil form parts and secures them together.

Formed integral with plate 7 is a taut band support finger 12 to which the inner end of a front taut band is secured. Integral with plate 7 and projecting upwardly therefrom is a pointer support structure 13 which includes a support plate 14 having an upwardly projecting staff 15. Staff 15 is located centrally of and is integral with plate 14 and projects vertically upwardly in the same plane as the plate. The lower coil form part 8 including plate 14 and staff 15 are integrally formed from this sheet metal of uniform thickness and flat as viewed in side elevation at FIG. 5. The upper tip 16 of the staff is rounded and the staff has an enlarged portion 17 with rounded sides intermediate its ends. The upper edges 18 of plate 14 at each side of staff 15 form stop edges to limit the extent that pointer 19 can be pushed onto staff 15.

Pointer 19 is formed from a plastic material with memory characteristics such that the pointer will straighten even if the coil assembly 3 is pivoted at a rate sufficiently high that the pointer strikes the usual stop with sufficient force to bend the pointer. The material of pointer 19 is dimensionally stable, corrosion resistant, and non-moisture absorbing so there will be no changes of weight or dimensions of the pointer with age. A preferred material for the pointer is a polysulfone plastic which has the advantageous properties described above.

As shown at FIG. 2, pointer 19 takes the form of an elongated tubular body of uniform diameter and wall thickness throughout its length. By virtue of the memory characteristics of the polysulfone material of the pointer, the pointer can be readily mounted on moving coil assembly 8 merely by pushing the pointer downwardly over staff 15 from the position of FIG. 2 until lower edge 20 of the pointer seats on stop edges 18 of plate 14. To facilitate pushing the pointer over the staff, the staff has the rounded upper tip 16. The enlarged portion 17 of the staff frictionally retains the pointer in its seated position on the staff. By virtue of the stop edges 18 each pointer of successively constructed meters is seated at precisely the same location relative to plate 14 and moving coil assembly 8. This provides for repeatable accuracy of meters provided with the pointer 19.

FIGS. 4–6 show a second embodiment of a pointer constructed in accordance with this invention. Pointer 19' is identical to pointer 19 save that a substantial length of the upper portion 21 of the pointer is flattened to provide a knife like blade 22 along the length of the pointer above upper tip 16 of staff 15. As is apparent with reference to FIG. 4, pointer 19' is mounted on staff 15 so the narrow portion of blade 22 extends longitudinally of the meter, and correspondingly, pointer 19' presents a narrow knife edge profile as viewed by an observer at the front of the meter.

As is apparent with reference to FIG. 5, the enlarged portion 17 of staff 15 causes the lower portion of the pointer to neck in slightly at the location where the pointer extends over this enlarged portion of the staff. FIG. 6 shows an enlarged view of the pointer 19' with its sides flattened to provide the blade portion 22.

The pointer 19' of FIGS. 4–6 is formed by merely flattening the upper portion 21 of the tubular pointer 19 between flat faces of a suitable press. Even though the polysulfone plastic material from which pointers 19 and 19' are formed has memory characteristics which cause the pointer to straighten, should it be bent slightly, the tubular pointer 19 can be permanently flattened merely by squeezing the tube between flat elements as described above. It has been found that a tubular polysulfone pointer 19 of a diameter in the range of 0.020–0.030 inches with a wall thickness of 3 mils or less can be used to advantage with D'Arsonval type meters having a moving coil, such as the meter 1 of FIG. 1. Squeezing together the upper portion 21 of tubular pointer 19 to form the pointer 19' also provides a pointer which can be used to advantage with D'Arsonval type meters. A pointer with a diameter of 0.025 inches and a wall thickness of three mils can be used to extreme advantage with meter 1.

The moving coil assembly and pointer of this invention have distinct advantages. First, since staff 15 is integral with the coil form, the coil form provides a construction with a minimum number of parts. In addition, since both pointers 19 and 19' are frictionally held in position on staff 15 no cementing or crimping is required to retain the pointer on the moving coil assembly. Since no cements are used, the mass added to the moving coil assembly when the pointer is installed is accurately predetermined and there is no danger of moisture absorption because the cement is not required. Since crimping is also not necessary there is no danger of bending or otherwise damaging the delicate thin metal of the staff or coil assembly. Hence, accurately positioning counterweight 23 on tail 10 to statically balance coil assembly 3 is easily accomplished.

While a preferred embodiment of moving coil and two embodiments of a pointer have been shown and described herein it is to be understood that changes can be made in the details of construction without departing from the scope of this invention as set forth herein and specified in the appended claims.

What is claimed is:

1. In a measuring instrument, an instrument pointer arrangement particularly characterized by the absence of cements and solder to retain the pointer on a support and in which the pointer is formed from an elastic material capable of gripping the support to frictionally retain the pointer on the support comprising, in combination, a pointer of lightweight plastic material having memory characteristics; a movable instrument mechanism; a pointer support mounted on the mechanism; the pointer having an opening, and the pointer support having a dimension larger than the opening; the support extending into the opening of the pointer, and the plastic material of the pointer gripping the support by virtue of its memory characteristics to retain the pointer on the support, whereby, the pointer can be mounted on the supply by simply forcing the pointer onto the support where it is retained by the gripping action of the material of the pointer.

2. A pointer arrangement according to claim 1 wheerein said body is tubular along at least a portion of its length and has a wall thickness less than 3 mils.

3. A pointer arrangement according to claim 1 wherein the material of said body is a polysulfone plastic material.

4. A pointer arrangement according to claim 1, wherein, said pointer has a stop face adjacent said opening; and an instrument carried by said instrument mechanism engages said stop face to limit the distance the pointer can be moved onto the support.

5. A pointer for a sensitive instrument comprising an elongated, tubular body of impact resistant plastic material with memory characteristics, so that the pointer will straighten after it is impacted against a stop; said body having an opening at one end to receive a staff for mounting the point on an instrument; a portion of said body having parallel walls in contacting relation to provide a generally knife-edge structure at a location remote from said end portion; said body being frictionally retained on said staff; and said plastic material having non-moisture absorbing characteristics, whereby, the static balance of an instrument equipped with the pointer does not change with aging.

6. A pointer according to claim 5 wherein the plastic material of said body is a polysulfone plastic material; and the wall thickness of said body is less than 3 mils.

7. An improved pointer and moving element for a sensitive accurate meter comprising, in combination, a moving meter element mounted for pivotal movement aboujt an axis; a staff connected to said element for movement therewith, said staff having an enlarged portion at a location along its length; a pointer formed from a plastic material with memory characteristics, said pointer having an opening theerein dimensioned to receive said staff, said opening being normally smaller than the enlarged portion of said staff, and said enlarged portion of said staff extending into said opening, whereby said pointer is frictionally retained on said staff; and balance weight means carried by said moving element to counterbalance said pointer throughout a predetermined range of pivotal movement of the moving element.

8. An improved pointer and moving element according to claim 7 wherein said pointer is tubular and is of uniform wall thickness along its length, and the material of said pointer is a plastic material having non-moisture absorbing characteristics.

9. An improved pointer and moving element according to claim 7 wherein said moving element includes a coil frame, and a coil on the frame; and said staff is integral with said coil frame.

10. An improved pointer and moving element according to claim 7 wherein said pointer has a wall thickness less than about 3 mils; and a diameter in tyhe range of 0.02 inches to 0.03 inches.

11. An improved pointer and moving element according to claim 10 wherein said pointer is of a polysulfone material.

* * * * *